Sept. 12, 1967 HUGH L. DRYDEN 3,341,778
DEPUTY ADMINISTRATOR OF THE NATIONAL
AERONAUTICS AND SPACE ADMINISTRATION
OPTIMUM PRE-DETECTION DIVERSITY RECEIVING SYSTEM
Filed March 20, 1964 3 Sheets-Sheet 1

INVENTORS
LOUIS KATZ
RAYMOND W. HONEY
VICTOR R. SIMAS
[signature]
Earl Levy
ATTORNEYS.

INVENTORS
LOUIS KATZ
RAYMOND W. HONEY
VICTOR R. SIMAS

G. D. O'Brien
Carl Levy
ATTORNEYS

INVENTOR.
LOUIS KATZ
RAYMOND W. HONEY
VICTOR R. SIMAS

ATTORNEYS 3,341,778

OPTIMUM PRE-DETECTION DIVERSITY RECEIVING SYSTEM

Hugh L. Dryden, Deputy Administrator of the National Aeronautics and Space Administration, with respect to an invention of Louis Katz, Anaheim, and Raymond W. Honey, Fullerton, Calif., and Victor R. Simas, Lanham, Md.

Filed Mar. 20, 1964, Ser. No. 353,644
17 Claims. (Cl. 325—305)

ABSTRACT OF THE DISCLOSURE

Two independent diversity receiving channels, by action of automatic gain control (AGC) and phase-lock loops contained in each of the receiving channels, adjust the signals thereof so that the output intermediate frequency (IF) signals from both channels are equal in amplitude and phase coherent. The AGC voltages generated in each channel, in addition to controlling the level of the signal thereof, are measures of the signal to noise ratio (SNR) of the IF signal in the channel with which they are associated. The IF signals and the AGC voltages are applied to a novel combiner which includes two voltaged controlled attenuators (VCA's), and AGC weighting network, and a summing circuit. In the AGC weighting network the various AGC voltages are combined to produce a control voltage which is in turn applied to the VCA's. Also coupled to the VCA's are the IF signals from the respective channels associated therewith. The control voltage from the weighting network varies the attenuation ratios of the VCA's such that the IF signal having the smaller SNR is attenuated more than the IF signal having the greater SNR. The signals from the VCA's, after being summed in the summing circuit, are then applied to a demodulator.

The invention described herein was made in the performance of work under a NASA contract and is subject to the provisions of Section 305 of the National Aeronautics and Space Act of 1958, Public Law 85–568 (72 Stat. 453; 42 U.S.C. 2457).

The present invention relates to a diversity receiving system, and, more particularly, to an optimum pre-detection diversity combining receiving system adapted for use with amplitude modulation (AM), phase modulation (PM) or narrow band frequency modulation (FM) systems.

Diversity receiving of radio signals is a well known method of reception applied with success to radio transmissions in order to minimize the fading effects. This principle is equally beneficial in reducing fading effects in spacecraft to ground communications wherein the fading may be due to the continuously changing polarization orientation of the received signal with respect to the receiving antenna. For instance, if the spacecraft transmitted signal polarization is linear and the ground antenna is polarized linearly, then as the spacecraft orientation changes, the level of the received signal can vary from zero to some maximum value. Two receiving antennas polarized orthogonally would be an application of the diversity concept and would assure a received signal close to optimum in at least one of the antennas as far as polarizaton effects are concerned. This diversity concept applies not only to linearly polarized radiation but to circular or elliptical as well.

In the various diversity receiving systems, there is always required some means for combining the signals to produce the best possible signal-to-noise ratio (SNR). Mr. Leonard R. Kahn in his article in the "Proceedings of the Institute of Radio Engineers" for November 1954, volume 42, on page 1705 describes a diversity combining system called the ratio-squarer system in which the optimum diversity combining law is utilized so that at all times the combined SNR is greater than or at least equal to the best of the individual diversity channel SNR.

The invention as will be described hereinafter, while using the ratio-squarer system to obtain optimum diversity combining, accomplishes the basic objectives more accurately than has been done in the past; and further, it has the additional feature of maintaining a constant output signal.

Accordingly, it is an object of the present invention to provide an improved and more accurate optimum diversity combining receiving system.

It is another object of the present invention to provide an improved optimum pre-detection diversity combining receiving system wherein the combined total signal has a maximum SNR and the output signal thereof is maintained constant.

It is still another object of the present invention to provide an improved optimum diversity combining system wherein the circuit design and electrical components are selected so that the combined total signal will have a maximum SNR and the combined signal thereof will be maintained exactly constant.

It is a further object of the present invention to provide an optimum diversity combining receiving system wherein precise optimum combining is accomplished prior to signal detection to eliminate certain deleterious effects.

These and other objects are carried out by the present invention in which the inputs of two independent receiving channels are derived from separate receiving antennas, which may be for example, cross polarized antennas and/or antennas located some distance apart. Since the receiving channels and the components thereof are chosen to be similar, the effective receiver noise voltages present in both receiving channels and associated with the signals thereof are substantially equal. The effective receiver noise voltage of each receiving channel is defined as the total receiver noise referred to the input terminals of the receiver and includes the internal noise produced by the initial stages of the radio frequency (RF) amplifier of the receiver and any noise fed to the receiver by the antenna. It should be noted that the inherent characteristics of the random noises in the two channels are a flat frequency characteristic and statistical independence.

Both of the receiving antennas received signals at the same frequency. However, variations of amplitude (signal strength) and phase (time of arrival) of the signals received by the two antennas may occur which result in their having an unpredictable amplitude difference and phase difference. To insure that the output signals from the two receiving channels are maintained equal in amplitude and phase coherent so that they can be properly combined, automatic gain control (AGC) and phase-lock means are provided in both receiving channels. While the signal portion of total signal (signal plus noise voltage associated therewith) from one receiving channel is modified to be identical with that from the other receiving channel, different values of additive white random noise are generally associated with each signal. For this reason therefore, each total signal usually has a different signal-to-noise ratio (SNR).

A novel combiner, as will be described in detail hereinafter, weights the sum of the two total signals through the action of two voltage controlled attenuators (VCA), having logarithmic characteristics, so that an output therefrom continually results in a constant sum and a maximum ratio of combined output signal-to-noise. The voltage controlled attenuators are controlled by AGC voltages, which bear a required relationship to the signal-to-noise ratio (SNR) in each of the two receiving channels wherein they are generated, so that the weaker of the two total signals is attenuated more while the stronger is attenuated less.

The necessary attenuation characteristics of the VCA's to provide the required two conditions to be met in the diversity combining system, i.e., (1) maximum output signal-to-noise ratio for all values of input noise and signal levels, and
(2) constant output signal level for all values of input noise and signal levels, is derived below for the case under consideration in which the IF signals ($S_i$) applied to the VCA's are equal and phase coherent (by action of the AGC systems and phase-lock loops in the receiving channels), and the noise voltages ($N_1$, $N_2$) are statistically independent and generally unequal. Under these conditions it follows that the time averaged signal power ($S_o^2$) and the time averaged noise power ($\overline{N}_o^2$) from the combiner are:

$$S_o^2=(a_1+a_2)^2S_i^2=\text{constant} \quad (1)$$

$$\overline{N}_o^2=a_1^2\overline{N}_1^2+a_2^2\overline{N}_2^2 \quad (2)$$

where:

$S_i$=signal voltage from each receiving channel
$N_1$=effective noise voltage from one receiving channel
$N_2$=effective noise voltage from the other receiving channel
$a_1$=voltage attenuation ratio of attenuator associated with said one receiving channel
$a_2$=voltage attenuation ratio of attenuator associated with said other receiving channel
$S_o$=combined signal output from combiner
$N_o$=combined noise voltage output from combiner The output signal-to-noise power ratio is then:

$$S_o^2/\overline{N}_o^2=\frac{(a_1+a_2)^2S_i^2}{a_1^2\overline{N}_1^2+a_2^2\overline{N}_2^2} \quad (3)$$

Substituting equation (1) in equation (3) eliminates the term $a_2$ and provides the following identity:

$$S_o^2/\overline{N}_o^2=\frac{S_o^2}{a_1^2\overline{N}_1^2+(S_o/S_i-a_1)^2\overline{N}_2^2} \quad (4)$$

Now proceeding to maximize the output signal-to-noise power ratio for constant output signal by differentiating both sides of Equation 4 with respect to $a_1$ and equating to zero; there is derived the following expression:

$$\frac{d(S_o^2/\overline{N}_o)^2}{da_1}=[-S_o^2a_1^2\overline{N}_1^2+(S_o/S_i-a_1)^2\overline{N}_2^2]^{-2}$$
$$[2a_1\overline{N}_1^2+2(S_o/S_i-a_1)(-1)\overline{N}_2^2]=0 \quad (5)$$

Rewriting Equation 5 in a more simple form by eliminating the portion that cancels out, the following relationship is obtained:

$$2a_1\overline{N}_1^2+2(S_o/S_i-a_1)(-1)\overline{N}_2^2=0 \quad (6)$$

$$a_1(\overline{N}_1^2+\overline{N}_2^2)=S_o/S_i\overline{N}_2^2 \quad (7)$$

Now, solving for $a_1$:

$$a_1=\frac{S_o/S_i\overline{N}_2^2}{\overline{N}_1^2+\overline{N}_2^2}=\frac{S_o/S_i}{1+\overline{N}_1^2/\overline{N}_2^2} \quad (8)$$

By rearranging the terms of the Equation 1 the following identity is obtained:

$$a_2=S_o/S_i-a_1 \quad (9)$$

Now, by substituting Equation 8 in equation 9, $a_2$ then assumes the following relationship:

$$a_2=S_o/S_i-S_o/S_i\frac{\overline{N}_2^2}{\overline{N}_1^2+\overline{N}_2^2}=S_o/S\left(1-\frac{\overline{N}_2^2}{\overline{N}_1^2+\overline{N}_2^2}\right) \quad (10)$$

$$a_2=S_o/S_i\frac{\overline{N}_1^2}{\overline{N}_1^2+\overline{N}_2^2}=\frac{S_o/S_i}{1+\overline{N}_2^2/\overline{N}_1^2} \quad (11)$$

Accordingly, the values of $a_1$ in Equation 8 and $a_2$ in Equation 11 are the required attenuation ratios necessary for satisfying the two specified diversity combining system conditions set out above. An attenuator which can satisfy each of these equations will be described in detail hereinafter.

The exact nature of this invention, as well as other objects and advantages thereof, will be readily apparent from consideration of the following specification relating to the annexed drawings in which.

Figure 1:
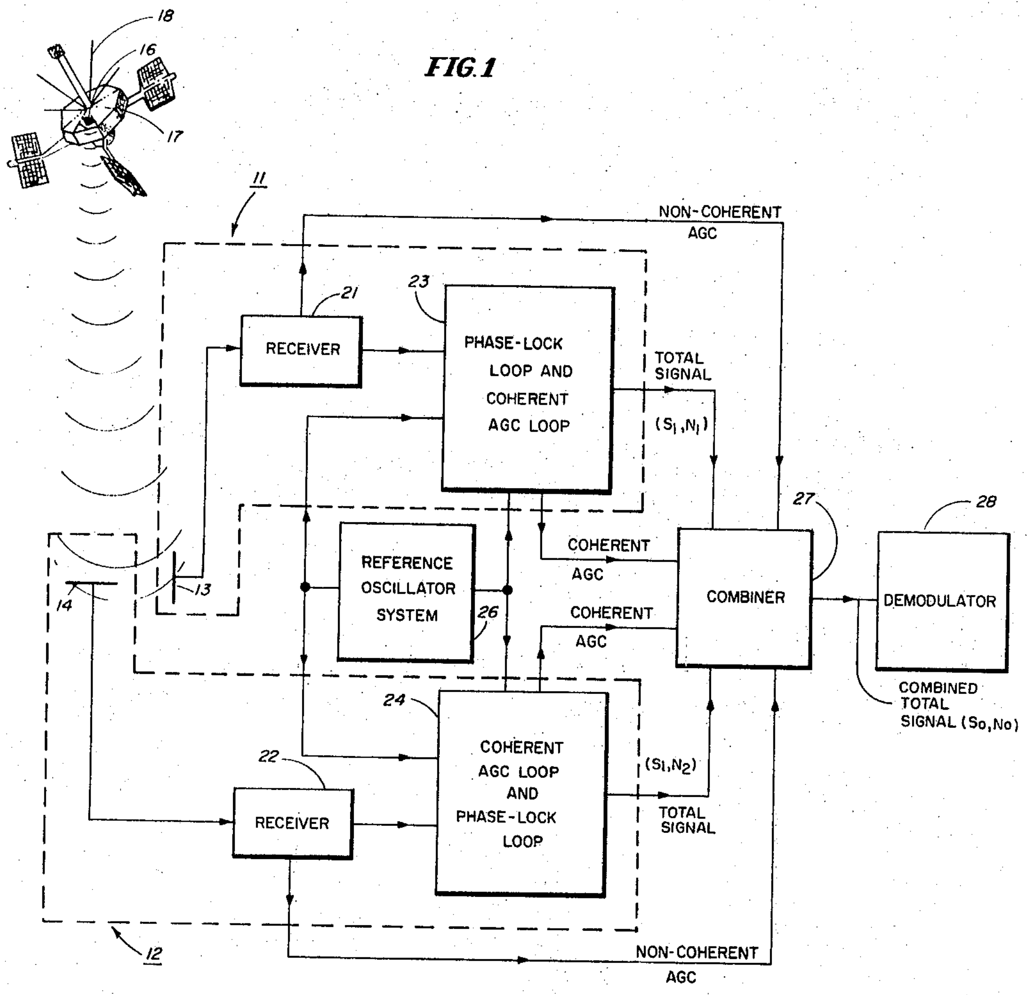
FIGURE 1 shows a block diagram of the preferred optimum pre-detection diversity combining receiving systems of the present invention.

Referring now to the drawings, wherein like reference characters designate like or corresponding parts throughout, there is shown in FIGURE 1 an optimum pre-detection combining diversity receiving system comprising two independent receiving channels 11, 12 having substantially equal effective receiver noise voltages at the input terminals thereof and having antennas 13, 14, respectively cross-polarized. A beacon transmitter 16 located in either a stationary object or a moving object such as spacecraft 17 radiates a linearly polarized signal from radiating antenna 18. By antennas 13, 14 being cross-polarized, the diversity receiving system is assured of receiving the transmitted signal even if its polarization might vary, as for example, when spacecraft 17 is moving and radiating antenna 18 varies in position relevant to receiving antennas 13, 14. While there is always the assurance that the transmitted signal will be picked up by antennas 13, 14, as already mentioned above, a time variation of the amplitude and phase thereof will usually result in the signals received by receiving channels 11, 12 having unpredictable phase differences and amplitude differences.

To modify the received signals so that these differences no longer exist and, in fact, so that the signals are equal in amplitude and coherent in phase, the conditions essential for them to be properly combined, receiving channels 11, 12, as shown in FIGURE 1, include, in addition to antennas 13, 14, heterodyning receivers 21, 22 and phase-lock and coherent automatic gain control (AGC) loops 23, 24, respectively. A reference oscillator system 26 is connected to phase-lock and coherent AGC loops 23, 24 to assist these loops in modifying the intermediate frequency (IF) signals applied thereto from receivers 21, 22, respectively, so that they become equal to the reference signal frequency.

Figure 2:
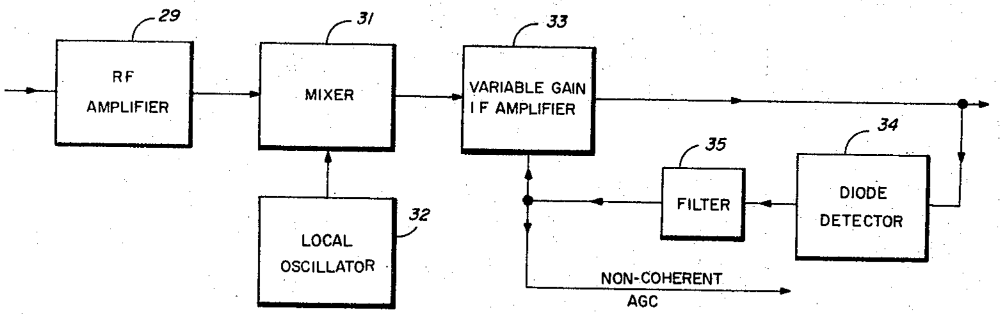
FIGURE 2 shows a block diagram of the receiver portion of FIGURE 1.

Since both receiving channels 11, 12 are identical and operate in the same manner, the following discussion, while relating to receiving channel 11, applies equally as well to receiving channel 12. Receiver 21, as shown in detail in FIGURE 2, comprises a wide-band radio frequency (RF) amplifier 29 to which is fed the RF total signal picked up by antenna 13. A mixer 31 is connected to the wide-band RF amplifier 29 and to a local oscillator 32 to heterodyne the RF total signal from the RF amplifier 29 with the signal from local oscillator 32. This provides an IF total signal which is coupled to a variable gain IF amplifier 33. A conventional diode detector 34 and series low pass filter 35 are connected from the output of variable gain IF amplifier 33 to an input thereof to act as an automatic gain control (AGC) for variable IF amplifier 33 by applying a non-coherent (AGC) voltage thereto. In this manner the IF total output signal (signal and effective noise voltage associated therewith) from variable gain IF amplifier 33 is maintained at a fixed level. This non-coherent AGC voltage is a measure of the receiver SNR in that it is proportional to the logarithm of the SNR due to the fact that the components of the variable gain IF amplifier are chosen so that it has a logarithmic characteristic.

For all receiver signal levels where the SNR of the receiver signal is less than unity, the output total signal from variable gain IF amplifier 33 contains, essentially, a constant noise amplitude and therefore, the non-coherent AGC voltage is a measure of the noise only and independent of the signal which is assumed to vary in amplitude. On the other hand, should the SNR of the receiver signal be greater than unity then the output of variable gain IF amplifier 33 contains a constant output signal amplitude and is independent of noise. The non-coherent AGC voltage is then a measure of signal only and consequently also of the SNR in the receiver since the noise is constant.

The coherent AGC voltages to be discussed in connection with FIGURE 3 and the IF total output signals from phase-lock and coherent AGC loops 23, 24, along with non-coherent AGC voltages from receivers 21, 22 are applied to a novel combiner 27 (to be described in detail hereinafter in connection with FIGURES 4–7). In the combiner 27 the IF total signals are weighted, according to their respective signal-to-noise ratios (SNR), prior to combining so that the one having the lowest SNR has less effect upon the SNR of the combined IF signal. Accordingly, by the performance of the weighting action in combiner 27, the combined total signal output therefrom, has a maximum SNR for all values of the signals acquired by antennas 13, 14 and is applied to demodulator 28. In addition, the combined total signal output ($S_o$) from combiner 27 is constant for all the values of the signals received by antennas 13, 14, and at the same time is always equal to the IF signal ($S_i$) derived from either of the receiving channels 11, 12, i.e., $S_o=S_i=$constant.

Figure 3:
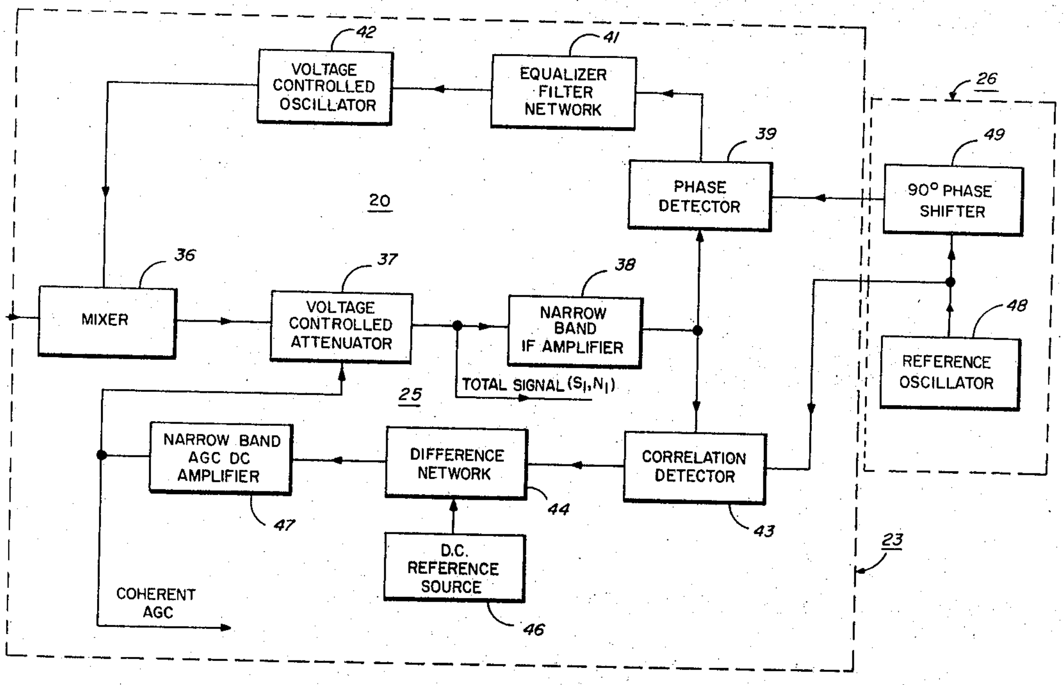
FIGURE 3 depicts a block diagram of the phase-lock and coherent AGC loops and reference oscillator system of FIGURE 1.

Phase-lock and coherent AGC loops 23 are shown in FIGURE 3 as comprising a phase-lock loop 20 and coherent AGC loop 25. Phase-lock loop 20 includes mixer 36, voltage controlled attenuator (VCA) 37 (to be described in detail hereinafter), IF narrow-band amplifier 38, phase detector 39, equalizer filter network 41 and voltage controlled oscillator (VCO) 42, all connected as shown. The total signal output from variable gain IF amplifier 33 of receiver 21, after being applied to mixer 36 of this loop, has the frequency and phase of the carrier portion of the signal thereof adjusted by the loop so that when it is applied from VCA 37 to combiner 27 it will be phase coherent with its counterpart of the signal applied to combiner 27 from the VCA of receiving channel 12.

Coherent AGC loop 25, in addition to including VCA 37 and narrow-band IF amplifier 38 of phase-lock loop 20, also includes correlation detector 43, difference network 44, DC reference source 46 and AGC DC amplifier 47, all connected as shown. Coherent AGC loop 25 controls the amplitude of the signal from VCA 37 so that it will be constant and equal to its counterpart signal taken from the VCA of receiving channel 12. Accordingly, by the action of these two loops in conjunction with reference oscillator system 26, the operation of which will be described in detail hereinafter, the signal ($S_i$) of receiving channel 11 is modified to be identical in amplitude and coherent in phase with its counterpart signal ($S_i$) obtained from receiving channel 12.

The following is a description of the operation of phase-lock loop 20. The IF signal from variable gain amplifier 33, and the output of VCO 42 are applied to mixer 36 and heterodyned therein; and the heterodyned output signal from mixer 36 is thereafter attenuated by VCA 37 and amplified by narrow-band IF amplifier 38 to establish both the level and band width of the signal applied thereto. The output signal from narrow-band IF amplifier is coupled to phase detector 39, which is a balanced product detector. Also coupled to phase detector 39 is an output signal from reference oscillator 48 of reference oscillator system 26, after the reference oscillator signal has been shifted 90 degrees by a 90 degree phase shifter 49. The quadrature relationship between the carrier component of the signal from narrow-band IF amplifier 38 and the signal from reference oscillator 48 causes phase detector 39 to produce a DC voltage output proportional to the phase difference (off quadrature) between the two signals. This DC voltage is fed via equalizer filter network 41, a low pass filter circuit, as a smoothed DC voltage to voltage controlled oscillator (VCO) 42 to control the frequency thereof such that phase coherence is maintained between the 90 degrees shifted signal from reference oscillator system 26 and the carrier component of the IF signal from narrow-band IF amplifier 38. In this manner the frequency of the signal from VCO 42 tracks the frequency of the carrier component of the IF signal applied from variable gain IF amplifier 33 to mixer 36. Thus, with these signals changing frequency simultaneously and in-phase, the output level of phase detector 39 tends to approach zero.

One example of VCO 42 would be a Colpitt's oscillator in which the inductor of the tank circuit is a saturable reactor. By controlling the current flow through this reactor, the oscillator frequency, which can be made a linear function of the control current flowing through the reactor, is controlled over its designed frequency range.

While the above description appears to indicate that the DC voltage from phase detector 39 is only proportional to the phase relationship between the 90 degrees shifted signal of reference oscillator system 26 and the carrier component of the IF signal from narrow-band IF amplifier 38, this is not absolutely correct since this DC voltage is also proportional to the amplitude of the carrier component of the IF signal from narrow-band IF amplifier 38. The reason that the amplitude of the carrier component was neglected in the above discussion, was due to the fact that it was maintained constant by coherent AGC loop 25. This coherent AGC loop supplies an AGC DC control voltage to VCA 37 to adjust the attenuation thereof so that the carrier component of the IF signal applied to phase detector 39 of phase-lock loop 20 is maintained at a constant amplitude. This VCA has a characteristic such that the logarithm of attenuation is precisely linear with the DC control voltage applied thereto as further explained below.

The following is a description of the operation of AGC loop 25. The carrier output component of the IF signal from IF amplifier 38, in addition to being applied to phase detector 39, is also applied, along with the direct output from reference oscillator 48, to correlation detector 43, a balanced product detector which is a circuit well known in the art. Since the reference signal and carrier component of the IF signal from IF amplifier 38 have already been phase locked in quadrature by the phase-lock loop 20, the signals applied to the correlation detector are in-phase and the AGC DC output from correlation detector 43 is then proportional to the amplitude of the carrier component of the IF signal. Correlation detector 43 is so designed that its output is independent of the reference signal input level. The noise voltage accompanying the input signal produces a fluctuation of the DC output from correlation detector 43. This fluctuation is smoothed by the narrow band AGC DC amplifier 47 after the DC voltage output from correlation detector 43 has been compared (subtracted) with a fixed DC voltage from reference source 46 in difference network 44. The difference comparison between the DC voltage output from correlation detector 43 and the DC voltage of reference source 46 is carried out so that VCA 37 will operate in the proper portion of its control range by the application of the AGC voltage applied thereto from AGC amplifier 47. The smoothed, substantially noise free AGC DC voltage from AGC amplifier 47 is then applied to VCA 37 to control the attenuation thereof so that the carrier component of the IF signal, coupled from narrow-band IF amplifier 38 to phase detector 39, is maintained constant. The phase-lock loop dynamics are thus made relatively independent of the input signal level over the operating range of the AGC system.

Figure 4:
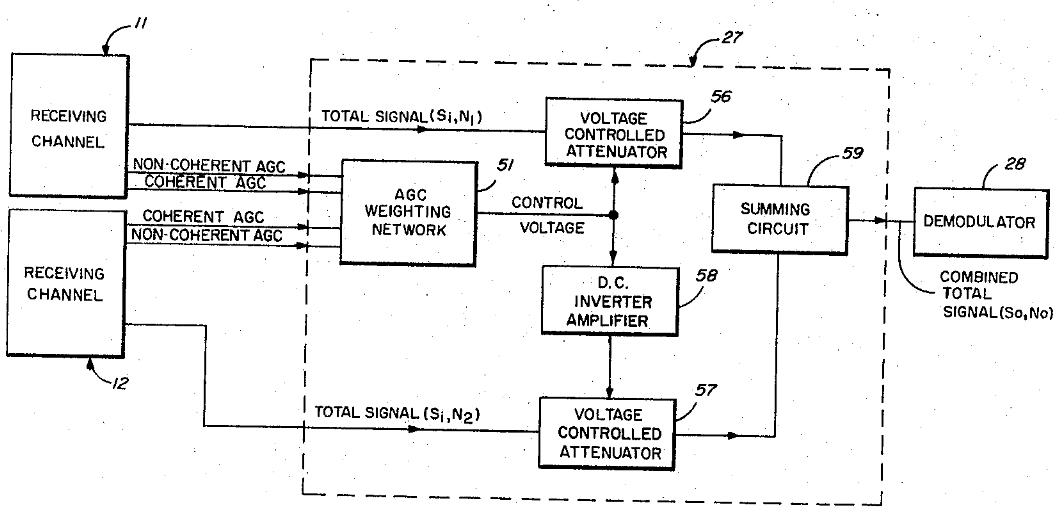
FIGURE 4 shows a block diagram of the novel combiner of FIGURE 1.

The total signal from VCA 37, in addition to being coupled to narrow-band IF amplifier 38; and the coherent AGC voltage from narrow-band AGC DC amplifier 47, in addition to being applied to VCA 37, are both coupled, along with the non-coherent AGC voltage from diode detector 34 of receiver 21, to combiner 27 as shown in FIGURES 1 and 4.

While the above description relates to only one receiving channel 11, it should be understood that the other receiving channel 12, in cooperation with reference oscillator system 26, operates in the same manner so that the output signal from the VCA of these phase-lock and coherent AGC loops 24 has the same amplitude as the signal from VCA 37 and is phase coherent therewith. The total signal from the VCA of the phase-lock and coherent AGC loops 24, the coherent AGC voltage from the coherent AGC loop thereof, and the non-coherent AGC voltage from receiver 22 are applied, along with their counterparts in receiving channel 11, to combiner 27.

Combiner 27, as shown in FIGURE 4, includes AGC weighting network 51 to which is applied the AGC voltages from receiving channels 11, 12; a DC inverter amplifier 58 coupled to AGC weighting network 51; voltage controlled attenuator (VCA) 56, to which is coupled the total signal from receiving channel 11 and the combined AGC output from AGC weighting network 51; voltage controlled attenuator (VCA) 57 to which is coupled the total signal from receiving channel 12 and the combined AGC output from AGC weighting network 51 via inverter amplifier 58; and summing circuit 59 to which is applied the attenuated total signals from VCA's 56, 57. This combiner, as will be described in more detail hereinafter, fulfills the previously derived optimum combining requirements by controlling the attenuation of the two total signals from receiving channels 11, 12 such that the poorer quality total signal is attenuated more while the superior quality total signal is attenuated less. In this manner the combined total signal quality (SNR) is always equal to or better than the total signal quality from either of the two receiving channels and can, in fact, be better than either total in SNR by as much as 3 decibels (db).

Figure 5:
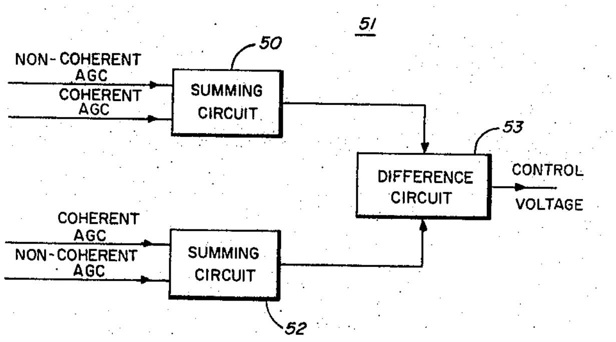
FIGURE 5 illustrates a block diagram of the AGC weighting network of FIGURE 4.

AGC weighting network 51 of combiner 27, as shown in FIGURE 5, comprises summing circuits 50 and 52, of the type well known in the art, to which are applied the non-coherent AGC and coherent AGC voltages of receiving channels 11, 12, respectively; and difference circuit 53 to which is coupled the summed AGC outputs from summing circuits 50, 52.

Assuming, as has been done herein, that the signal levels are varying because of the ever-changing polarization of the input signals and that both receiving channels 11, 12 have equal effective receiver noise voltages at their input terminals, then the non-coherent AGC voltages developed in both receivers of the receiving channels, where the SNR's are greater than unity, are measures in (db) of the SNR's of their respective receiving channels. Since the non-coherent AGC circuits act to provide substantially constant signal levels in the phase-lock and AGC loops 23, 24, the coherent AGC voltages developed in their coherent AGC loops are essentially constant. Now, should the receiving channels have SNR's less than unity, then the outputs from the receivers are substantially constant noise voltages and the non-coherent AGC voltages are essentially constant. In this case, since the coherent AGC's function to provide constant signal levels in their respective receiving channels, they are measures, in db, of the SNR's of the receiving channels.

Accordingly, by AGC weighting network 51 summing the non-coherent and coherent AGC voltages of each receiving channels 11, 12 in summing circuit 50, and 52, respectively, and subtracting the outputs from the summing circuits in difference circuit 53, the output from the difference circuit is a control voltage that is an accurate measure, in db, of the relative signal-to-noise ratios for the two receiving channels under all conditions of input signals and noise. This weighting network 51 is in effect a special analog computer wherein DC voltages proportional to the logarithm (decibel) are added and subtracted to provide a DC voltage proportional to the logarithm of product and quotient, respectively.

The control voltage from difference circuit 53 of AGC weighting network 51 is applied directly to VCA 56 and through a DC inverter amplifier 58 to VCA 57. Applied to the inputs of VCA 56, 57 are the total signals from receiving channels 11, 12, respectively. With the control voltage from difference circuit 53 being applied to VCA's 56, 57 in the manner just described, the attenuations of the VCA's are adjusted so that, in effect, as the total signal output from one VCA increases that from the other decreases. Accordingly, should the signal level of receiving channel 11 be higher than that from receiving channel 12, then the output from difference circuit 53 is positive and the attenuation of VCA 56 is reduced and that of VCA 57 is increased. An opposite effect on VCA's 56, 57 occur when the signal level of receiving channel 12 is higher. In this manner, when the output signals from VCA 56, 57 are applied to summing circuit 59 and added therein, a signal $S_0$ is developed therefrom that is always constant. In addition, the combined total signal therefrom, that is applied to demodulator 28, has a SNR equal to or greater than the SNR existing in either of the two receiving channel signals.

Figure 6:
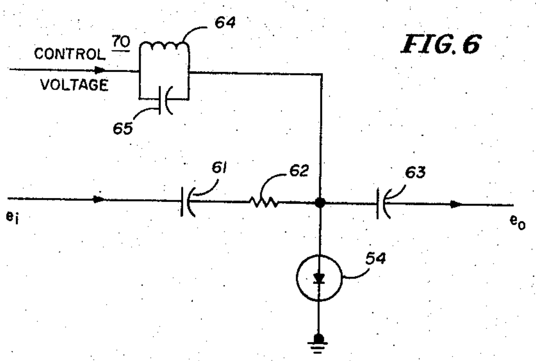
FIGURES 6 and 7 depict schematic diagrams of two embodiments of the voltage controlled attenuators (VCA) of FIGURE 4.
Figure 7:
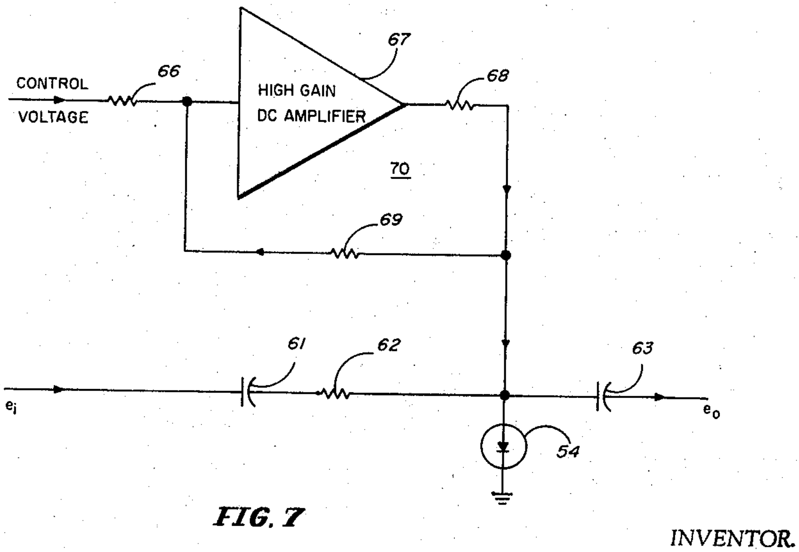

Referring now to FIGURES 6 and 7, the preferred embodiments of VCA 56, 57, there is shown a high conductance logarithmic silicon diode 54 having one end thereof grounded and the other end connected to an input circuit comprising a series combination of DC blocking capacitor 61 (low AC impedance) and resistor (R) 62. Also connected to the other end of the diode 54 is an output circuit including a DC blocking capacitor 63 (low AC impedance). The VCA's, shown in FIGURES 6 and 7, are identical except for the control signal feeding circuit 70. In FIGURE 6, control signal feeding circuit 70 includes a parallel combination of inductor 64 and capacitor 65; and in FIGURE 7 it includes a series combination of resistor 66, high gain DC amplifier 67 and resistor 68, and, in addition, feedback resistor 69. In both the VCA's the total signal obtained from the receiving channel, with which the particular VCA is associated, is applied to capacitor 61 thereof, and the attenuated total signal from the VCA is coupled via capacitor 63 to summing circuit 59.

In FIGURE 6, the DC control voltage derived from AGC weighting network 51, shown in FIGURE 5, is applied to the VCA via the parallel combination of inductor 64 and capacitor 65, which combination has a high AC impedance and a low DC impedance. This control voltage is applied to diode 54 to vary its impedance. The high AC impedance of the parallel combination of inductor 64 and capacitor 65 prevents the total signal from feeding into AGC weighting circuit 51. Diode 54 has a logarithmic characteristic and has its impedance varying in accordance with the DC control voltage applied thereto from AGC weighting network 51. This will cause the VCA to attenuate the total input signal applied to the diode in a logarithmic fashion as indicated by Equation 12.

The attenuator of FIGURE 7 operates in the same manner as that of FIGURE 6 except that the DC control voltage is applied through resistor 66 to high gain DC amplifier 67. This control signal feeding circuit has a high impedance value for an AC signal in comparison with resistor 62. Feedback resistor 69, high gain DC amplifier 67 and resistor 66, insure a precise DC voltage across diode 54 linear with the DC control voltage applied thereto regardless of the DC resistance of diode 54. Since amplifier 67 has a high gain for DC voltages, the DC impedance of the circuit is reduced sufficiently to permit the DC control voltage from AGC weighting network 51 to be applied to and control the impedance of diode 54 so that the total signal applied thereto via blocking capacitor 61 and resistor (R) 62 is attenuated to a proper value before being passed to summing circuit 59.

It is important to note that with diode 54 connected in the VCA in the polarity shown in FIGURES 6 and 7, a positive control voltage applied to diode 54 reduces its impedance, thereby increasing the attenuation of the VCA to reduce the output signal therefrom. Alternatively, a negative control voltage applied to diode 54 increases the diode impedance, and, accordingly, causes a reduction in the attenuation of the VCA. Since the DC control voltage is applied to VCA's 56, 57 in an opposite polarity due to the inverter 58, that is, there is applied a positive DC control voltage to one VCA and a negative DC control voltage to the other VCA, diode 54 is connected to have the same polarity in the two voltage controlled attenuators. On the other hand, if DC inverter amplifier 58 was omitted, the diodes 54 would be connected in a reverse polarity in the two VCA's, i.e., e.g., the diodes of the VCA shown in FIGURES 6 and 7 would be connected as shown when used as VCA 56 and would be connected in reverse polarity when used as VCA 57. By the diodes in the two VCA's being connected in this manner, except when the AGC voltage inputs to difference circuit 53 are equal, one VCA will always be attenuating more than the other.

The following mathematical analysis applies equally as well to VCA's circuit of either FIGURES 6 and 7 and indicates how the VCA's fulfill the requirements set out hereinabove in Equations 8 and 11. Each VCA comprises, essentially, an ordinary fixed resistor (R) 62 and a silicon diode 54 whose alternating current (AC) resistance is characteristically a logarithmic function of the DC control voltage (E) applied via control signal feeding circuit 70. The small-signal AC resistance ($R_s$) of the silicon diode 54 varies logarithmically as a function of the control voltage and is defined as follows:

$$R_s=R_o10^{-K_1E} \quad (12)$$

where:

$K_1$ and $R_o$ are diode constant parameters describing diode 54, and, specifically, $R_o$ is the value of the AC resistance for zero voltage control, and E is the DC control voltage applied to diode 54.

The voltage gain of the VCA is:

$$a=e_o/e_i=\frac{R_s}{R+R_s}=\frac{1}{1+R/R_s} \quad (13)$$

Now, substituting Equation 12 in Equation 13 the following expression is obtained:

$$a=\frac{1}{1+(R/R_o)10^{K_1E}}=\frac{1}{1+10^{K_1E+\log(R/R_o)}} \quad (14)$$

Since the summed AGC DC voltages from each receiving channel is linearly proportional to the signal-to-noise ratio in db, it therefore follows that the ratio of the time averaged signal power to the time averaged noise power of the two receiving channels can be defined as follows:

$$P_1=S_i^2/\overline{N}_1^2 \quad (15)$$

and $$P_2=S_i^2/\overline{N}_2^2 \quad (16)$$

The difference in the summed AGC DC voltages from the two receiving channel obtained from the AGC combining network expressed as a log function of the voltage is as follows:

$$E=K_2(10\log P_2)-K_2(10\log P_1)=K_2 10\log P_2/P_1 \quad (17)$$

where:

$K_2$ is a proportionality constant which relates DC volts to db,

E is the DC control voltage applied to the silicon diode of the VCA's from the AGC combining network, $P_1$ and $P_2$ are defined by Equations 15 and 16, respectively, and $K_2(10\log P_1)$ and $K_2(10\log P_2)$ are the voltages from summing circuits 50 and 52, respectively.

Now, substituting Equations 15 and 16 into Equation 17 the following identity is obtained:

$$E=K_2 10\log(S_i^2/\overline{N}_2^2)(\overline{N}_1^2/S_i^2) \quad (18)$$
$$=K_2 10\log \overline{N}_1^2/\overline{N}_2^2$$

Then, substituting Equation 18 in Equation 14 $a_1$ becomes:

$$a_1=\frac{1}{1+10^{K_1K_2 10\log \overline{N}_1^2/\overline{N}_2^2+\log(R/R_o)}} \quad (19)$$

and since the control voltage applied to the other VCA is of opposite polarity, then $a_2$ becomes:

$$a_2=\frac{1}{1+10^{-K_1K_2 10\log \overline{N}_1^2/\overline{N}_2^2+\log(R/R_o)}} \quad (20)$$

Now, by requiring that:

$$K_2=\tfrac{1}{10}K_1$$

and also that $$R=R_o$$

it is discovered that Equations 19 and 20 reduce to:

$$a_1=\frac{1}{1+\overline{N}_1^2/\overline{N}_2^2} \quad (19')$$

and $$a_2=\frac{1}{1+\overline{N}_2^2/\overline{N}_1^2} \quad (20')$$

respectively.

Since the diversity system, as described hereinabove, has been designed so that $S_o=S_i=$constant, or $S_o/S_i=1$ then Equations 8 and 11 above reduce to:

$$a_1\frac{1}{1+\overline{N}_1^2/\overline{N}_2^2} \quad (8')$$

and $$a_2=\frac{1}{1+\overline{N}_2^2/\overline{N}_1^2} \quad (11')$$

Now, comparing Equations 19′ and 20′ with Equations 8′ and 11′ respectively, it can be readily noted that they are identical. Accordingly, the VCA's of FIGURES 6 and 7 satisfy the system conditions set out hereinabove, and the diversity combining system described herein can be considered to be a truely optimum pre-detection diversity combining system.

In an operative embodiment of the voltage controlled attenuator of FIGURE 7—wherein the input signal ($e_i$) applied thereto was at a frequency of .5 megacycle and has a voltage as high as .1 volt peak, but was generally much less than 10 millivolts; the control voltage (E) applied to diode 54 was between .6 and .8 volt DC over a 50 db range; silicon diode 54 was a Texas Instruments, Incorporated type G–130 (commonly referred to as a stabistor); and high gain DC amplifier had substantially zero gain at .5 megacycles and 50,000 gain at DC—the values of the various components thereof were as follows:

| | | |
|---|---|---|
| Capacitor **61** | microfarad | .08 |
| Capacitor **63** | do | .08 |
| Resistor **66** | kilohms | 50 |
| Resistor **68** | do | 50 |
| Resistor **69** | do | 50 |
| Resistor **62** (R) | ohms | 510 |

Diode 54 had small-signal AC resistance $R_s$ from 10 ohms to 500 ohms depending upon the value of DC control voltage (E) applied thereto according to relationship of Equation 12, and $R_o$ was equal to 510 ohms.

While the VCA's shown in FIGURES 6 and 7 have been described in connection with combiner 27, the same VCA's are used in the phase-lock and AGC loops 23, 24. However, there they are biased to operate over a different portion of the control range (i.e., different range of E), as will now be shown. If in Equation 14 above:

$$10^{K_1E+\log(R/R_o)}>>1$$

then the attenuation in db is:

$$20 \log a = -20 [K_1E + (\log R/R_o)]$$

Noting that $R/R_o$ is a constant, it can be seen that the attenuation expressed in db is linear with E (in this case the coherent AGC voltage). Because, as mentioned hereinabove, the effective receiver noise in each receiving channel is assumed to be equal, then the attenuation in db is proportional to the SNR. Thus, the coherent AGC voltage is a measure of the SNR as required in the combiner.

It is to be understood, that while the invention has been described in connection with the receiving station being ground located and having only two receiving channels, it is not limited to ground use nor to two channel operation, as it can function equally as well in a spacecraft and in connection with more than two receiving channels. For example, with a four (4) channel diversity system, the channels would be divided into pairs, each of the pairs to function in the manner described hereinabove to provide an optimum combined signal. Then, the output signals from the two combiners would themselves be processed in the same manner as discussed hereinabove in connection with the signals received by the two receiving antennas.

Although the foregoing disclosure relates to preferred embodiments of the invention, it should be understood that numerous modifications or alterations may be made therein without departing from the spirit and scope of the invention as set forth in the appended claims. For example, instead of a separate local oscillator being used with each receiver, a single oscillator can be used as a common local oscillator for both receivers.

What is claimed is:

1. The diversity receiving system having first and second receiving channels for use in a diversity reception system for receiving a transmitted signal, said diversity receiving system comprising: first receiving means included as part of said first receiving channel for receiving said transmitted signal and maintaining it and any noise voltage associated therewith at a constant level; second receiving means included as part of said second receiving channel for receiving said transmitted signal and maintaining it and any noise voltage associated therewith at a constant level; first phase adjusting and amplitude controlling means connected to said first receiving means, forming part of said receiving channel and including phase-lock means and automatic gain control means, said automatic gain control means providing an automatic gain control voltage; second phase adjusting and amplitude controlling means connected to said second receiving means, forming part of said second receiving channel and including phase-lock means and automatic gain control means, said automatic gain control means providing an automatic gain control voltage; reference oscillator means connected to said first and second phase adjusting and amplitude controlling means and cooperating therewith so that said phase-lock means and said automatic gain control means thereof function to provide signals from said receiving channels that are phase coherent and equal in amplitude; and combining means connected to said first and second phase adjusting and amplitude controlling means including weighting means for receiving the output signals from said phase adjusting and amplitude controlling means and said automatic gain control voltages from said automatic gain control means thereof and for weighting said output signals in accordance with said automatic gain control voltages so that the signal from said receiving channel having the lower signal-to-noise ratio is attenuated more than the signal from said receiving channel having the higher signal-to-noise ratio, and a summing means for combining said weighted signals and having as an output a constant signal having a signal-to-noise ratio equal to or greater than the signal-to-noise ratio of either of said receiving channel signals.

2. The diversity system of claim 1 wherein said phase-lock means of said first and second phase adjusting and amplitude controlling means are substantially the same and each includes a phase detector for comparing the phase of the incoming signal applied to the respective phase adjusting and amplitude controlling means with that of the signal from said reference oscillator means; a voltage controlled oscillator connected to said phase detector and having the frequency of its signal varied in accordance with the output from said phase detector; and a mixer connected to receive said incoming signal and said signal from said voltage controlled oscillator, whereby variations in phase of the incoming signal from that of the signal from said reference oscillator means results in a voltage being applied to said voltage controlled oscillator which in turn permits the voltage controlled oscillator to track the incoming signal and lock the output from said mixer to a signal at a desired frequency.

3. A diversity system of claim 2 wherein said automatic gain control means of said first and second phase adjusting and amplitude controlling means are substantially the same and each includes a correlation detector having the incoming signal from said phase adjusting and amplitude controlling means with which it is associated and said signal from said reference oscillator means applied thereto, said correlation detector detecting any variations in the amplitude of the said incoming signal and generating an automatic gain control voltage which is a measure of said variations in amplitude of said incoming signal from a desired value; and voltage controlled attenuating means connected to receive said incoming signal and having a control element; said voltage controlled attenuating means having applied thereto the output from said correlation detector, whereby the attenuation of the said voltage controlled attenuating means is varied in accordance with the signal applied thereto from said correlation detector such that said incoming signal applied to said voltage controlled attenuator means is attenuated and obtained as a constant amplitude output signal therefrom.

4. The diversity system of claim 3 wherein said weighting means comprises a difference circuit having applied thereto the automatic gain control voltages derived from said automatic gain control means of said first and second receiving channels, said difference circuit having as an output therefrom a control voltage which is a measure of the relative signal-to-noise ratios of the signals applied to said first and second receiving channels; first and second voltage controlled attenuators having applied to the inputs thereof the signals from said first and second receiving channels, respectively, and having connected to their control elements said control voltage, the outputs from said attenuators being applied to said summing means, whereby said voltage controlled attenuators are controlled such that the one having applied thereto the stronger signal-to-noise ratio signal is attenuated less and the one having the weaker signal-to-noise ratio is attenuated more and the output signal from said summing means is at a constant amplitude and has a maximum signal-to-noise ratio.

5. The diversity receiver of claim 4 wherein the attenuation ratios of said first and second voltage controlled attenuators have the following identities:

$$a_1=\frac{S_o/S_i}{1+\overline{N}_1^2/\overline{N}_2^2}$$

and $$a_2=\frac{S_o/S_i}{1+\overline{N}_2^2/\overline{N}_1^2}$$

respectively, where:

$a_1$=voltage attenuation ratio of said first voltage controlled attenuator
$a_2$=voltage attenuation ratio of said second voltage controlled attenuator
$S_o$=output signal from said summing means
$S_i$=signal voltage from either of said receiving channels
$\overline{N}_1^2$=time average effective noise power from said first receiving channel
$\overline{N}_2^2$=time average effective noise power from said second receiving channel.

6. The diversity system of claim 3 wherein said first and second receiving means each includes a variable gain intermediate frequency amplifier and an automatic gain control circuit for cooperating therewith to keep the output from said amplifier at a constant level; wherein each of said receiving channels has associated therewith a summing circuit to which is applied the automatic gain control voltage developed in the respective receiving channel; and wherein said weighting means includes a difference circuit for receiving the summed AGC voltages from said two receiving channels and for generating a control voltage in accordance with the difference between the automatic gain voltages applied thereto and first and second voltage controlled attenuators connected to receive the signals from said first and second receiving channels, respectively, each of said voltage controlled attenuators having a control element to which the output control voltage from said difference circuit is applied, said summing means being connected to receive the output signals from said voltage controlled attenuators, whereby said voltage controlled attenuators attenuate the signals applied thereto in accordance with the said control voltage applied to their respective control elements from said difference circuit such that the output signal from said summing means is maintained at a constant level and the signal-to-noise ratio thereof is at an optimum.

7. The diversity receiver of claim 6 wherein the attenuation ratios of said first and second voltage controlled attenuators have the following identities:

$$a_1=\frac{S_o/S_i}{1+\overline{N}_1^2/\overline{N}_2^2}$$

and $$a_2=\frac{S_o/S_i}{1+\overline{N}_2^2/\overline{N}_1^2}$$

respectively, where:

$a_1$=voltage attenuation ratio of said first voltage controlled attenuator
$a_2$=voltage attenuation ratio of said second voltage controlled attenuator
$S_o$=output signal from said summing means
$S_i$=signal voltage from either of said receiving channels
$\overline{N}_1^2$=time average effective noise power from said first receiving channel
$\overline{N}_2^2$=time average effective noise power from said second receiving channel.

8. The diversity system of claim 7 wherein each of said voltage controlled attenuators comprises a logarithmic silicon diode operating as said control element, an input circuit including an input resistor for coupling the signal from the receiving channel with which it is associated to said diode, a control signal feeding circuit for coupling said control voltage to said diode, and an output circuit for coupling the attenuated output signal from said diode to said summing means, whereby the attenuation of said signal from said receiving channel is varied in accordance with said control voltage.

9. The diversity system of claim 8 wherein the signal $S_i$ from either of said receiving channels is equal in amplitude to the combined output signal $S_o$ from said summing means, wherein the small-signal AC resistance of said logarithmic silicon diode is defined as follows:

$$R_s=R_o10^{-K_1E}$$

where:

E is said control voltage applied to said silicon diode from said difference circuit,
$R_s$ is the small-signal AC resistance of said silicon diode, and
$K_1$ and $R_o$ are diode constant parameters describing said diode, $R_o$ specifically being the value of AC resistance for zero control voltage; and wherein the resistance (R) of said input resistor is chosen to be equal to $R_o$, said control voltage E is proportional to the difference between said summed automatic gain control voltage in decibels by a proportionality constant $K_2$, and $K_2$ is chosen to be equal to $\frac{1}{10}K_1$.

10. A pre-detection optimum diversity receiver comprising: first and second receiving channels having equal effective receiver noise voltages; an antenna connected to said first receiving channel; another antenna, orthogonally polarized with respect to said aforementioned antenna, connected to said second receiving channel; automatic gain control means included in said receiving channels for generating automatic gain control voltages proportional to the signal-to-noise ratios of the signals passed thereby; means cooperating with said automatic gain control means for modifying said signals of said channels so that the output signals from said receiving channels are equal in amplitude and phase coherent; a weighting means, said weighting means including first and second voltage controlled attenuators connected to said first and second receiving channels, respectively, and a difference circuit connected to automatic gain control means for combining said automatic gain control voltages to produce a control voltage, said voltage controlled attenuators each having a control element to which is coupled said control voltage, whereby the impedances of said first and second attenuators are varied such that the signal from said attenuator having the lower signal-to-noise ratio is attenuated a greater amount than the signal from the one having the higher signal-to-noise ratio; and summing means connected to said weighting means for receiving the attenuated signals from said voltage controlled attenuators and combining them, whereby, by the action of said weighting means the output from said summing means is a signal having a maximum signal-to-noise ratio and a constant amplitude.

11. The diversity receiver of claim 10 wherein the attenuation ratios of said first and second voltage controlled attenuators have the following identities:

$$a_1=\frac{S_o/S_i}{1+\overline{N}_1^2/\overline{N}_2^2}$$

and $$a_2=\frac{S_o/S_i}{1+\overline{N}_2^2/\overline{N}_1^2}$$

respectively, where:

$a_1$=voltage attenuation ratio of said first voltage controlled attenuator $a_2$=voltage attenuation ratio of said second voltage controlled attenuator $S_o$=output signal from said summing means $S_i$=signal voltage from either of said receiving channels $\overline{N}_1^2$=time averaged effective noise power from said first receiving channel $\overline{N}_2^2$=time averaged effective noise power from said second receiving channel.

12. The diversity receiver of claim 11 wherein each of said voltage controlled attenuators comprises a logarithmic silicon diode operating as said control element, said logarithmic silicon diode having a small-signal AC resistance expressed as follows:

$$R_s=R_o10^{-K_1E}$$

where:

E is said control voltage from said difference circuit circuit and has a proportionality constant equal to $\frac{1}{10}K_1$, $R_s$ is the small-signal AC resistance of the silicon diode, and $K_1$ and $R_o$ are diode constant parameters describing said diode, $R_o$ specifically being the value of AC resistance for zero control voltage;

an input resistor (R) connected between said diode and said receiving channel with which it is associated, said input resistor (R) equal to $R_o$; a control voltage feeding circuit connected between said diode and said difference circuit for applying said control voltage to said diode; and an output circuit connected between said diode and said summing means.

13. In a diversity receiver having first and second receiving channels and wherein each of said receiving channels has means for generating an automatic gain control voltage proportional to the signal-to-noise ratio of the signal applied thereto and additional means for modifying said signal applied thereto such that the signals derived from said receiving channels are equal in amplitude and phase coherent, the improvement comprising: a combiner including first and second voltage controlled attenuators connected to receive said signals from said first and second receiving channels, respectively, said attenuators each having a control element; a weighting network connected to receive said automatic gain control voltages from said receiving channels for producing a control voltage, said control voltage being coupled to said control elements of said voltage controlled attenuators for varying the attenuation thereof; and a summing means for receiving the output signals from said voltage controlled attenuators, whereby in accordance with said control voltage applied to said attenuators the receiving channel signal having the higher signal-to-noise ratio is attenuated less than that having the lower signal-to-noise ratio, such that the output signal from said summing circuit is maintained constant and the signal-to-noise ratio thereof is at an optimum.

14. The diversity receiver of claim 13 wherein the attenuation ratios of said first and second voltage controlled attenuators having the following identities;

$$a_1=\frac{S_o/S_i}{1+\overline{N}_1^2/\overline{N}_2^2}$$

and $$a_2=\frac{S_o/S_i}{1+\overline{N}_1^2/\overline{N}_2^2}$$

respectively, where:

$a_1$=voltage attenuation ratio of said first voltage controlled attenuator $a_2$=voltage attenuation ratio of said second voltage controlled attenuator $S_o$=output signal from said summing means $S_i$=signal voltage from either of said receiving channels $\overline{N}_1^2$=time averaged effective noise power from said first receiving channel $\overline{N}_2^2$=time averaged effective noise power from said second receiving channel.

15. In the diversity receiver system of claim 14 each of said voltage controlled attenuators of said combiner comprising: a logarithmic silicon diode operating as said control element, an input circuit including an input resistor for coupling the signal from the receiving channel with which it is associated to said diode, a control signal feeding circuit for coupling said control voltage to said diode, and an output circuit for coupling the attenuated output signal from said diode to said summing means.

16. In the diversity receiver of claim 15, said silicon diode of each of said voltage controlled attenuators having a small-signal AC resistance expressed as follows:

$$R_s=R_o10^{-K_1E}$$

where:

E is said control voltage from said weighting network and has a proportionality constant equal to $\frac{1}{10}K_1$, $R_s$ is the small-signal AC resistance of the silicon diode, $K_1$ and $R_o$ are diode constant parameters describing said diode, $R_o$ specifically being the value of AC resistance for zero control voltage, said input resistor having the resistance (R) thereof equal to $R_o$; and said control voltage E having a proportionality constant $K_2$ equal to $\frac{1}{10}K_1$.

17. In the diversity receiving system of claim 16, said first and second voltage controlled attenuators varying in gain in accordance with said control voltage applied to said silicon diodes thereof such that the output signal from said summing means is adjusted so that it is maintained equal to said signal applied to said first voltage controlled attenuator from said first receiving channel.

References Cited

UNITED STATES PATENTS

| | | | |
|---|---|---|---|
| 2,969,457 | 1/1961 | Felix et al. | 325—305 |
| 3,029,338 | 4/1962 | Sichak | 325—305 X |
| 3,030,503 | 4/1962 | Kahn | 325—305 X |
| 3,195,049 | 7/1965 | Altman et al. | 325—305 |
| 3,233,177 | 2/1966 | Stone | 325—414 X |

KATHLEEN H. CLAFFY, *Primary Examiner.*

R. S. BELL, *Assistant Examiner.*